Feb. 26, 1952     E. H. YONKERS, JR     2,587,565
SUCTION CLEANER

Filed March 20, 1948     2 SHEETS—SHEET 1

Inventor
Edward H. Yonkers, Jr
by Robert L. Kahn
Attorney.

Feb. 26, 1952     E. H. YONKERS, JR     2,587,565
SUCTION CLEANER
Filed March 20, 1948     2 SHEETS—SHEET 2
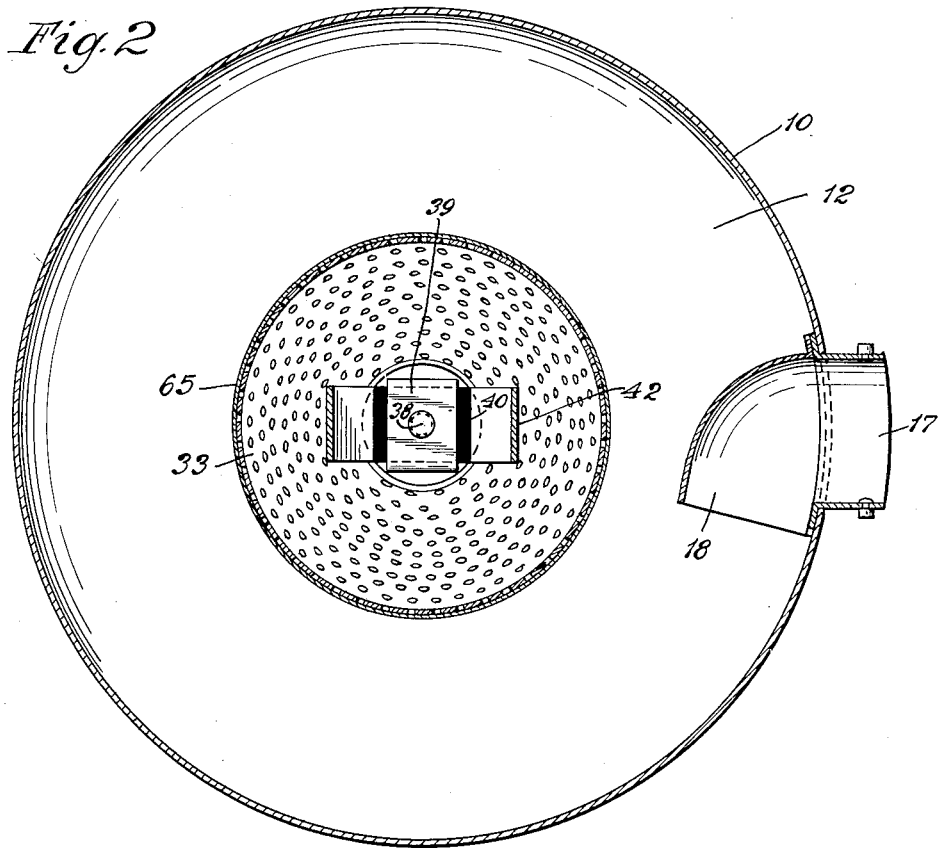
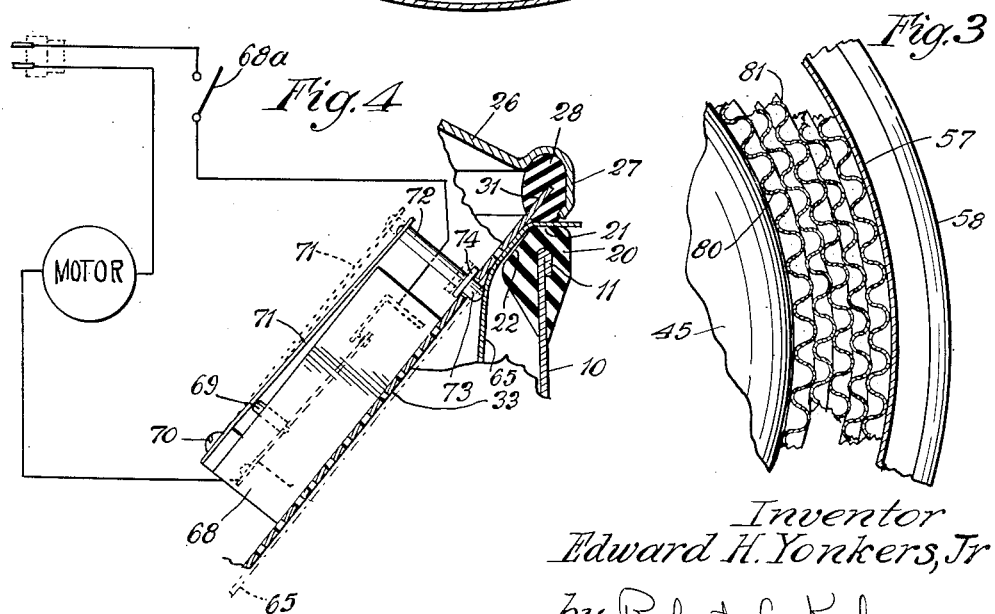
Inventor
Edward H. Yonkers, Jr
by Robert L. Kahn
Attorney.

Patented Feb. 26, 1952

2,587,565

UNITED STATES PATENT OFFICE 2,587,565

SUCTION CLEANER

Edward H. Yonkers, Jr., Glencoe, Ill.

Application March 20, 1948, Serial No. 16,111

5 Claims. (Cl. 183—37)

This invention relates to a suction cleaner and is an improvement upon the suction cleaner disclosed and claimed in my Patent 2,198,568, granted April 23, 1940. The suction cleaner disclosed and claimed in such patent is of the tank type wherein a dust retaining pan is provided with an inlet nozzle for dirt laden air. Resting on top of the pan and closing the same is a filter and blower assembly. The filtering medium proper is a conical sheet of paper disposed vertically with the tip near the pan bottom and through which air is sucked permitting dirt to fall to the bottom of the pan.

The invention disclosed herein is an improvement upon the above cleaner and provides a construction which is simple and economical to manufacture and assemble. In addition to the above, improved silencing means for the air exhaust is provided. Additionally there is provided an automatic switch whereby the cleaner will not operate unless a filter element is positioned in the pan.

For a more complete description of the invention, reference will be made to the drawing wherein Figure 1 is a sectional elevation of a cleaner embodying the present invention.

Figure 2 is a section on line 2—2 of Figure 1.

Figure 3 is a sectional detail on line 3—3 of Figure 1.

Figure 4 is a circuit diagram with the automatic switch and its mounting shown.

Figure 1:
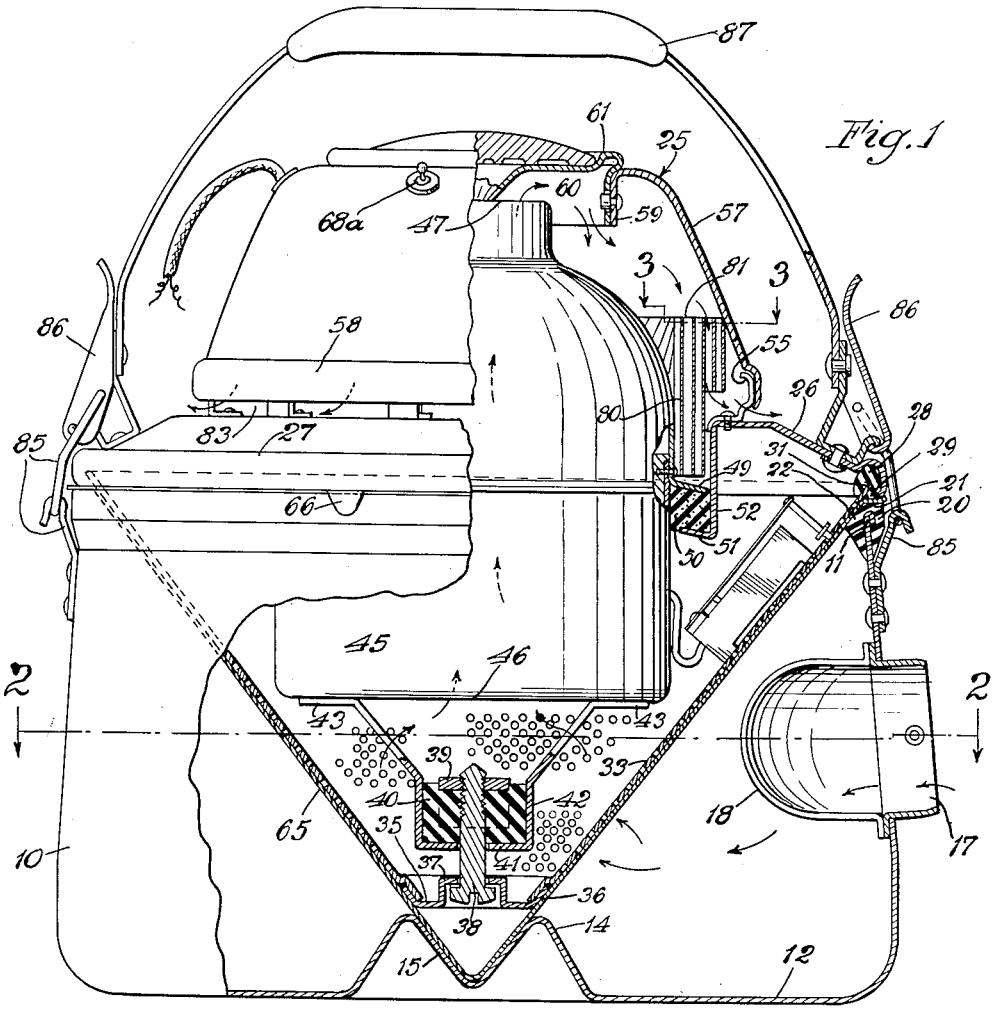
Figure 5:
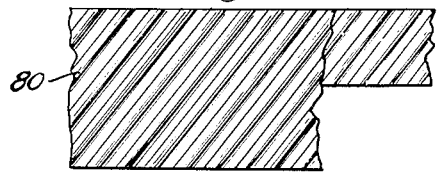
Figure 5 is a detail of the corrugated paper silencing means.
Figure 6:
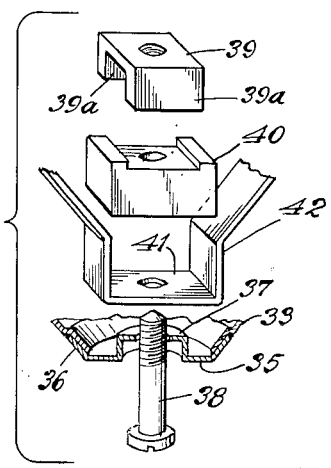
Figure 6 is a perspective of the coupling means.

The cleaner comprises pan 10 having a circular open top bounded by beaded edge 11. Pan 10 has bottom 12 the center part of which is deformed to provide internal annular ridge 14. Ridge 14 defines central conical region 15 for supporting a paper cone. The entire pan may be formed of steel, aluminum or any other suitable material. Air inlet 17 is disposed at the side of the pan and has suitable nozzle 18 for directing the incoming blast properly.

Disposed over beaded edge 11 is molded rubber gasket 20 of the shape shown. Gasket 20 has top surface 21 and inner surface 22 for purposes to be described later. Resting on surface 21 of gasket 20 is a cover assembly generally indicated by numeral 25. Cover assembly 25 comprises annular support member 26 having trough shaped rim 27 in which is disposed rubber gasket 28. Gasket 28 is pressed into trough 27 and has bottom surface 29 resting upon gasket surface 21 in sealing engagement therewith when the cleaner is assembled as shown.

Frictionally retained in slot 31 of gasket 28 is the large edge of conical backing member 33. Backing member 33 may be formed of metal or any other suitable material either inherently rigid or provided with stiffening means and is suitably perforated or formed as a foraminous backing member through which air may readily pass. Member 33 is preferably formed of perforated metal although metal screen may be used. At the small end of backing member 33 is reinforcement 35 of solid metal or other material and formed generally as a washer. Thus member 35 has conically shaped part 36 overlying the edge of backing member 33 at the small end thereof. These parts are preferably joined together as by welding or soldering but may be loose if desired.

Member 35 has counter-sunk portion 37 suitably apertured for receiving bolt 38. Bolt 38 extends upwardly as seen in Figure 1 and has nut 39 engaging the same. Nut 39 has spaced spider-like claws 39a extending downwardly toward the bolt head and grips resilient rubber coupling 40. Coupling 40 rests upon washer portion 41 of support 42. The parts of support 42 alternate with claws 39a around the outside of rubber coupling 40. Support 42 has supporting flange 43 attached to motor and blower unit 45. Such units are available on the market and need not be described in detail. In general however unit 45 has air inlet 46 and outlet 47 with air passing through the motor to cool it. Unit 45 has attached thereto, in any suitable manner, annular flange 49 extending outwardly therefrom. Below flange 49 is ring 50 of flexible vibration absorbing material such as sponge rubber or the like. Ring 50 rests upon flange 51 of annular support member 26. Annular support member 26 has generally vertical body portion 52, the rubber ring being disposed within the space formed by flanges 49 and 51 and portion 52.

Disposed on outer portions of annular support member 26 are spring clips 55. Clips 55 are riveted or otherwise secured to annular member 26 at spaced points around the extent of member 26. Normally engaging spring clips 55 is shroud 57 having suitably shaped annular portion 58 for springing over clips 55. At the upper part, shroud 57 has inturned edge 59 defining circular air discharge opening 60. Cover 61 of suitable shape is provided for closing discharge opening 60 when desired. The cover may be maintained in position by any suitable means, such as for example, by bayonet pin and slot means, as shown. When the cover is on, the blower unit discharges air into shroud 57.

Disposed around the outer surface of backing member 33 is conical filter element 65 preferably of paper of the type disclosed in the patent referred to. Filter paper 65 has its tip within conical region 15 of the pan while the large edge of the cone of the paper rests against surface 22 of the gasket. Tabs 66 on the filter paper may be provided at suitable spots for extending between opposed gasket surfaces 21 and 29 and are adapted to aid in removal and replacement of a paper element.

Disposed against the inside face of backing member 33 is switch 68. This switch is in series with the motor and manual switch 68a for normally controlling the motor circuit. Switch 68 is of the type available on the market and is adapted to open or close in response to a relatively small mechanical movement. Thus one type of such switch is described in Patent 1,960,020 and is available in the market under the trade name "Microswitch." Switch 68 has pin 69 which may be moved inwardly or outwardly a few hundredths of an inch for operating the switch mechanism. Switch 68 has its casing suitably attached to backing member 33. Thus the attaching means may comprise bolt 70. Bolt 70 carries leaf spring 71 carrying finger 72. Finger 72 has free end 73 extending through a suitable aperture in backing member 33. Collar 74 on finger 72 is provided to limit the travel of finger 72 outwardly through backing member 33 in response to the bias of leaf spring 71. Free end 73 of the finger is rounded and is adapted to bear lightly against the inner surface of filter paper 65. In the position shown in the drawing, filter paper 65 keeps finger 72 in a retracted position and permits switch 68 to be "on". In the event that no paper is present, finger 72 will assume a dotted line position in response to the bias of leaf spring 71 and turn the switch to "off" position. This will prevent the motor from starting. Thus dirt will not be blown into the blower and motor.

Disposed between annular portion 52 and a part of the casing of blower unit 45 is silencing material which may, in a simple form, comprise corrugated paper 80. Corrugated paper 80 is preferably cut on a bias so that the corrugations define an angle with the vertical axis of the cleaner. Such angle may be as desired and may simply be 45 degrees. A continuous spiral of paper or separate layers may be provided to fill the space. Part of the corrugated paper forms an annular barrier 81 extending under shroud 57. Barrier 81 of the corrugated paper is so shaped as to define annular space 83 communicating with the atmosphere. It will be evident that the corrugated paper provides a large number of parallel air discharge conduits. The length of the parallel conduits will be determined by the angle at which the paper is cut. A silencing action will thus result.

Suitable latches 85 may be attached at opposite sides to dust pan 10 and cooperating portions 86 of the latch may be attached to assembly 25. Handle 87 attached to two points upon assembly 25 may be used for carrying or moving the cleaner.

If desired, dust pan 10 may be mounted on or secured to casters for ready movement on a floor. In practice however, the smooth surface of the pan bottom will permit ready manipulation of the cleaner on a floor. It is understood that shroud 57 may be formed either of plastic or sheet metal or a combination of the two. This cover may be removed. Discharge opening 47 is preferably similar to inlet opening 17 so that attachments may be coupled to either or both of these openings.

What is claimed is:

1. A suction filter comprising an open topped pan having an air inlet at the side and an assembly resting upon the top thereof and forming a cover therefor, said assembly including a motor-blower unit and conical backing member adapted to pass air readily therethrough, said blower unit having an air inlet at the bottom and an air outlet at the top thereof with the air being adapted to pass through the motor for cooling the same, means at the center of the pan bottom for locating the tip of a paper cone filter, said cone filter being adapted to lie against the outside of said backing member and to have the large end thereof rest at the pan rim, a normally open electric switch for controlling said motor, said switch being disposed on said backing member and mechanical means cooperating with a paper filter for maintaining said switch closed to permit motor operation, said switch being adapted to be open when no paper filter is present to prevent dirt coming into said pan and passing through said backing member and into said motor.

2. A suction cleaner comprising an open-topped pan with a flexible paper cone filter, said filter having the cone tip extending into the pan and the cone rim being at the pan rim, said pan having an air inlet at the side and a suction generating assembly resting upon the pan rim and covering the pan, said assembly including the following: a motor blower unit having a casing enclosing the same, said casing having an air inlet opening at the bottom and an air outlet opening at the top for the unit, said assembly also including a conical backing member to support the filter, the backing member having the large end thereof at the pan rim and the small end thereof adjacent the pan bottom, a generally bell-shaped shroud, means cooperating with the edge of the shroud for supporting the shroud over and above said unit casing in spaced relation thereto so that the shroud is disposed over and spaced from the upper part of said casing and defines an annular region between the opposed shroud and casing surfaces, said casing discharge opening discharging air into the shroud interior, said shroud-supporting means being annular and having a part cooperating with an annular part of the unit casing to seal the low pressure region within the conical backing member, said shroud-supporting means having openings connecting the region within the shroud with atmosphere and corrugated paper disposed in the annular region between the shroud interior and exterior of the upper portion of the casing, said paper extending between the opposed casing and shroud surfaces and surrounding the casing and having the corrugations thereof oriented so that air passages are provided in a generally downward direction whereby air discharged from said unit must pass through said passages to atmosphere.

3. The structure according to claim 2 wherein said motor-blower unit has an annular supporting member and wherein said shroud has a spring edge cooperating with said supporting member so that said shroud may be snapped on or removed readily.

4. The structure according to claim 2 wherein said motor-blower unit includes an annular supporting member and wherein said shroud has a spring edge cooperating with said supporting member and wherein a resilient mounting between the motor-blower unit and backing member is provided whereby said entire unit may operate silently.

5. A suction filter comprising an open topped pan having an air inlet at the side and an assembly resting upon the top thereof and forming a cover therefor, said assembly including a motor-blower unit and conical backing member adapted to pass air readily therethrough, said blower unit having an air inlet at the bottom and an air outlet at the top thereof with the air being adapted to pass through the motor for cooling the same, means at the center of the pan bottom for locating the tip of a paper cone filter, said cone filter being adapted to lie against the outside of said backing member and to have the large end thereof rest at the pan rim, a normally open electric switch for controlling said motor, means for disposing said switch upon the side of the backing member remote from the paper filter and a finger carried by said switch, said finger extending through the backing member and normally engaging a portion of the paper filter to maintain the switch open when paper is present, said finger releasing said switch to return ot a normal open position when no paper is present.

EDWARD H. YONKERS, Jr.

REFERENCES CITED

The following references are of record in the file of this patent:

UNITED STATES PATENTS

| Number | Name | Date |
| --- | --- | --- |
| 1,789,203 | Upton | Jan. 13, 1931 |
| 1,878,409 | Lyford | Sept. 20, 1932 |
| 1,897,649 | Good | Feb. 14, 1933 |
| 1,921,085 | Korittke | Aug. 8, 1933 |
| 2,280,495 | Martinet | Apr. 21, 1942 |